United States Patent
Schmidt et al.

(10) Patent No.: US 7,301,119 B2
(45) Date of Patent: Nov. 27, 2007

(54) PROCESS FOR SHORT-TIME ARC-WELDING AND SHORT-TIME ARC-WELDING SYSTEM

(75) Inventors: Wolfgang Schmidt, Reiskirchen (DE); Arne Friedrich, Wettenberg (DE); Klaus G Schmitt, Giessen (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 11/346,539

(22) Filed: Feb. 2, 2006

(65) Prior Publication Data

US 2006/0124608 A1 Jun. 15, 2006

Related U.S. Application Data

(60) Division of application No. 10/763,123, filed on Jan. 22, 2004, now Pat. No. 7,045,736, which is a continuation of application No. PCT/EP02/08130, filed on Jul. 22, 2002.

(30) Foreign Application Priority Data

Jul. 23, 2001 (DE) ................... 101 36 991

(51) Int. Cl.
*B23K 9/20* (2006.01)
(52) U.S. Cl. ....................................... 219/98
(58) Field of Classification Search ............... 219/98, 219/99
See application file for complete search history.

(56) References Cited

U.S. PATENT DOCUMENTS

| | | | |
|---|---|---|---|
| 5,317,123 A | 5/1994 | Ito | |
| 5,406,044 A | 4/1995 | Killian et al. | |
| 5,938,945 A | 8/1999 | Hofmann et al. | |
| 6,011,234 A | 1/2000 | Kirchner et al. | |
| 7,045,736 B2 | 5/2006 | Schmidt et al. | |

FOREIGN PATENT DOCUMENTS

| | | |
|---|---|---|
| DE | 3432963 | 3/1986 |
| DE | 4236527 | 5/1994 |
| DE | 29521601 | 10/1997 |
| DE | 19828986 | 12/1999 |
| DE | 20003132 | 6/2000 |
| EP | 0488518 | 6/1992 |
| JP | 11-77310 A * | 3/1999 |

OTHER PUBLICATIONS

International Search Report for PCT/EP02/08130, dated Jan. 29, 2003, 5 pages.
Neue Tucker Technologie. Bolzenschweiβen mit System!, dated Sep. 1999 (Brochure in German with translation brochure attached).

* cited by examiner

*Primary Examiner*—Clifford C. Shaw
(74) *Attorney, Agent, or Firm*—Harness, Dickey & Pierce, P.L.C.

(57) ABSTRACT

A process and a system are proposed for short-time arc-welding elements, such as for example metal studs, on to components, such as for example metal sheets, wherein an element in the context of a welding operation is initially raised in relation to the component, a welding arc is formed between the element and the component, and the element is lowered again, the lifting height of the element in relation to the component being detected at least within a time segment between raising and lowering of the element.

The initiation of the lowering operation and/or the lowering operation itself is controlled as a factor of the detected lifting height such that a previously specified total welding time is achieved.

20 Claims, 2 Drawing Sheets

PROCESS FOR SHORT-TIME ARC-WELDING AND SHORT-TIME ARC-WELDING SYSTEM

CROSS-REFERENCE TO RELATED APPLICATION

This application is a divisional of U.S. patent application Ser. No. 10/763,123 filed on Jan. 22, 2004 now U.S. Pat. No. 7,045,736, which is a continuation of PCT application PCT/EP02/08130, filed on Jul. 22, 2002, which claims priority to DE 101 36 991.3, filed on Jul. 23, 2001, all of which are incorporated by reference herein.

BACKGROUND AND SUMMARY OF THE INVENTION

The present invention relates to a process for short-time arc-welding elements, such as for example metal studs, on to components, such as for example metal sheets, wherein an element in the context of a welding operation is initially raised in relation to the component, a welding arc is formed between the element and the component, and the element is lowered again, the lifting height of the element in relation to the component being detected at least within a time segment between raising and lowering of the component.

The present invention further relates to a short-time arc-welding system for welding elements, such as for example metal studs, on to components, such as for example metal sheets, with a welding device which, in the context of a welding operation, initially raises an element in relation to the component and then lowers said element again, to a lifting height detection device to detect the lifting height of the element in relation to the component at least within a time segment between raising and lowering of the component, to a power supply device which provides the power for forming an arc between the component and the raised element, and to a control device which triggers the welding device to raise and lower the element.

This process of short-time arc-welding or this short-time arc-welding system respectively is also known generally by the term "stud welding", for example from a brochure entitled "Die neue TUCKER-Technologie. Bolzenschweiβen mit System!" ["New TUCKER technology. The stud welding system!"], published by Emhart TUCKER in September 1999.

The technology of stud welding is used in particular, but not exclusively, in automotive engineering. With this technology, studs with or without a thread, nuts, eyes and other elements can be welded on to body panels. As a rule, the elements then serve as holding anchors for fastening interior trim elements, for example, to the vehicle body.

In the case of the above-cited stud welding in accordance with TUCKER, an element is initially placed in a welding head. This can take place using an automatic feed device, for example by means of compressed air. By means of the welding head the element is now positioned at the appropriate point on the component. A pre-welding current is then switched on which flows through the stud and the component. The element is then raised in relation to the component. An arc forms. The arc flow is selected such that initially contaminants, surface coatings such as zinc, oil or dry-film lubricants, etc. are burned off. The current then switches to a welding current. As a result of the high welding current the mutually opposing end faces of the element and component melt. The element is then lowered again on to the component so the mutual melts are mixed. The welding current is switched off when the component is reached and the arc short-circuits. The melt solidifies and the weld joint is complete.

In a generally known embodiment, the element is raised and lowered in relation to the component takes place by means of an electromagnet or by means of a spring. To raise the element, the electromagnet is triggered against the force of a compression spring. To lower the element, the electromagnet is switched off and the energy stored in the spring presses the element against the component. In a more recent embodiment, the raising and lowering of the element in relation to the component are achieved by an electric motor, in particular by a linear motor. The linear motor is capable of driving along a predetermined lifting profile over time highly dynamically. In order to ensure that the specified lifting profile over time does not alter during operation, it is known to measure the path of the linear motor and to return said path to form a closed loop.

From EP 0241 249 B1 (corresponding to DE-OS 36 11 823), it is known to measure the welding arc voltage and to control the welding current provided by means of a switched-mode power supply as a factor of the detected arc voltage, it thus being possible to even out the welding conditions varying from welding point to welding point and, despite unfavorable circumstances, to achieve perfect welds. A fixed lifting curve over time is predetermined for the lifting movements of the element in relation to the component. A further short-time arc-welding system is known from WO 96/10468. In this system the arc voltage during the welding operation is regulated to a desired value wherein the lifting height of the element in relation to the component is regulated. By this means it is possible not only to regulate the welding current but also the welding voltage during the welding operation, such that predetermined profiles of these parameters are repeatedly optimally achieved over many welding operations. The lowering operation takes place at a predetermined lowering speed and is initiated at a certain point in time. It has been shown that the above-mentioned known short-time arc-welding processes are still capable of improvement in respect of consistency from welding operation to welding operation. The object of the present invention is to indicate an improved process of short-time arc-welding or an improved short-time arc-welding system, with which process or system, irrespective of the particular welding conditions, optimal welding results are achieved. The object of the invention is achieved in the case of the process of short-time arc-welding mentioned at the outset in that the initiation of the lowering operation and/or the lowering operation itself is controlled as a factor of the detected lifting height such that a previously specified total welding time is achieved. In the short-time arc-welding system mentioned at the outset, the object of the invention is achieved in that the control device triggers the welding device in such a manner that the initiation of the lowering operation and/or the lowering operation itself takes place as a factor of the lifting height reached such that a previously specified total welding time is achieved. According to a further aspect, this object in the case of the process of short-time arc-welding mentioned at the outset is achieved in that the initiation of the lowering operation and/or the lowering operation itself is controlled as a factor of the lifting height detected, such that a previously specified total welding energy is achieved. The object of the invention is fully achieved in this manner. In the case of systems, in particular, wherein the lifting height during the welding operation is variable, the present invention offers the advantage of a more even quality of weld. In the case of the arc-welding process with regulation of the lifting height according to the prior art, owing to the fixed point in time of the initiation of the lowering operation and owing to the fixed prescription of the lowering speed, different total welding times may result. This can lead to different welding results from case to case. By contrast, according to the invention the previously specified total welding time is always reached constantly from case to case, irrespective of the lifting height regulation curve. Altogether, more consistent welding results can be achieved in this manner despite different boundary conditions (for example surface states).

In accordance with a further aspect of the invention, to achieve more consistent welding results there is no focus on a previously specified total welding time, but instead on a previously specified total welding energy, wherein the energy input into the welding operation is predetermined and the point in time of initiation of the lowering operation and/or the lowering operation itself are controlled as a factor of the detected lifting height such that the previously specified total welding energy is achieved.

The description hereinafter generally focuses on total welding time. All references to total welding time, however, are also intended to refer alternatively or cumulatively to the total welding energy. For example, it may be sensible to control the initiation of the lowering operation and/or the lowering operation itself as a factor of the detected lifting height such that a previously specified combination of total welding time and total welding energy is achieved.

The present invention is also applicable to arc-welding processes wherein the lifting height is not regulated, but is controlled to a value which is substantially constant. When using the welding process according to the invention, it is possible in this embodiment to achieve a previously specified total welding time without necessitating the prescription of a specific trigger time for initiating the lowering operation. Instead, the process according to the invention is used to achieve the previously specified total welding time by detecting the lifting height during the welding operation and controlling the initiation of the lowering operation such that the previously specified total welding time is achieved. In a particularly preferred process the point in time of initiation of the lowering operation and/or the lowering speed is/are controlled as a factor of the detected lifting height in order to achieve the previously specified total welding time. By means of these two parameters, the previously specified total welding time can be achieved in a comparatively simple manner in software engineering terms. It is especially preferred if the lowering speed is constant irrespective of the lifting height and if the time of initiating the lowering operation is controlled as a factor of the lifting height in order to achieve the previously specified total welding time. In this embodiment the lowering speed can be selected such that, on the one hand, the lowering operation takes place rapidly enough to prevent melt dripping from the underside of the element. On the other hand, a speed can be selected that is sufficiently slow in order to prevent excessively rapid immersion in the melt of the component and thus rebounding. Depending on the actual lifting height during the welding operation, the lowering operation is initiated such that the previously specified total welding time is achieved.

In accordance with an alternative embodiment, the lowering operation is initiated at a previously specified time and the lowering speed is controlled in order to achieve the previously specified total welding time. This alternative embodiment is slightly easier to produce in terms of programming. The lowering speed is optionally variable, however, depending on the respective lifting height regulated during the welding operation. From the foregoing it is understood that the goal of achieving a previously specified total welding time can also be achieved in that control of the initiation of the lowering operation and control of the lowering operation itself (its speed) can be combined with one another.

Furthermore, it is also possible to control the lowering operation itself so as to control the acceleration of the lowering movement. For example, it may be sensible to lower the element at high speed directly after initiating the lowering operation and to reduce said speed gradually in order subsequently to achieve a comparatively gentle immersion of the element in the melt of the component. Altogether it is preferable if the lifting height during the welding operation is regulated at least until the lowering operation is initiated. It is especially preferable if the regulation of the lifting height until initiation of the lowering operation serves to regulate the voltage of the welding arc to a constant value.

In the short-time arc-welding system according to the invention it is advantageous if the welding device has an electric motor to raise and lower the element. Although generally the present invention is also applicable to welding devices which use a combination of an electromagnet and a spring for lifting movements of the element, the use of an electric motor is preferred because of the ease of regulating electric motors and the comparatively simply achieved damping possibilities. In this context it is of particular advantage if the motor is a linear motor. In this development, it is not necessary to provide a rotational-translational converter to convert the rotational movements of the conventional electric motor into linear movements of the component. It is understood that the previously mentioned features and the features to be explained hereinafter can be used not only in the respectively indicated combination, but also in other combinations, or in isolation, without going beyond the scope of the present invention.

BRIEF DESCRIPTION OF THE DRAWINGS

Embodiments of the invention are represented in the drawings and are explained in the description hereinafter. In the accompanying drawings.

DETAILED DESCRIPTION

Figure 1:
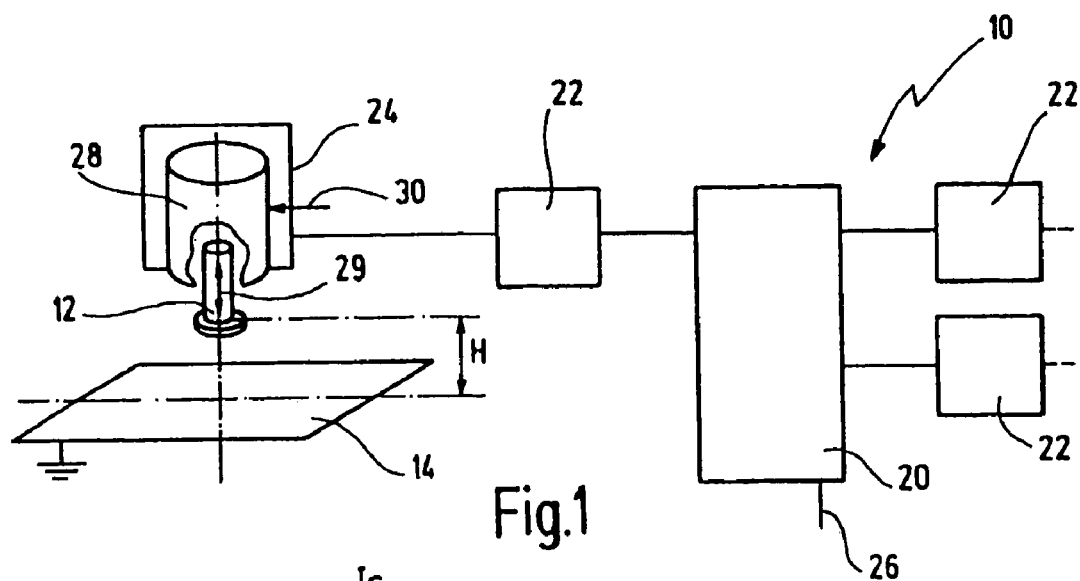
FIG. 1 shows a schematic view of a short-time arc-welding system according to the present invention.

In FIG. 1 a short-time arc-welding system according to the invention is generally referred to by 10. The welding system 10 serves to weld elements such as metal studs 12 on to components such as metal sheets 14. A typical practical example is the welding of fastening studs 12 on to the body panels 14 of motor vehicles. The elements concerned may be metal studs with or without a thread, nuts, eyes, etc. The component 14 may be a body panel, with sheet thicknesses as thin as 0.5 mm. The welding system 10 corresponds in its fundamental structure to the short-time arc-welding system which is disclosed in the brochure "Neue TUCKER-Technologie. Bolzenschweiβen mit System!" ["New TUCKER technology. The stud welding system!"] mentioned at the outset. The information disclosed in this brochure is implicit by reference. The welding system 10 has a control and energy unit 20 to which a plurality of, typically five, feed units 22 can be connected. At least one welding head 24 is connected respectively to the feed units 22, of which feed units 22 one is represented schematically in FIG. 1. The control and energy unit 20 has a power supply device to form an arc between the component 14 and the raised element 12. Further the control and energy unit has a main control device. The main control device serves, via suitable interfaces, inter alia to input and display process parameters and to communicate with other processes, for example a production line. The control and energy unit 20 has an interface 26 for the purpose of communicating with other processes. The feed units 22 serve to isolate and to reliably feed elements such as metal studs 12 to the welding head 24, said feed units 22 each having an isolating device, a pneumatic portion for conveying isolated elements to the welding head 24, and a feed control device.

The welding head 24 receives from the feed unit 22 one element 12 to be welded at a time. For this purpose the welding head 24 has a holder known per se (not shown in detail). Further a linear motor 28 is provided in order to move the holder—and with the holder the element 12—in a direction roughly perpendicular to the component 14 on a linear path, as is shown schematically at 29. Consequently by means of the electric linear motor 28 the height H of the element 12 can be adjusted in relation to the component 14 (lifting height). Further the welding head 24 has a lifting height detection means 30 which detects the respective actual lifting height H. In FIG. 1 the connections between the control and energy unit 20 and the feed unit 22 and between the feed unit 22 and the welding head 24 are shown respectively as a single line. However, it is understood that these connections each contain communication lines for the exchange of information and for transmitting control commands between the control devices of the control and energy unit 20, of the respective feed units 22 and of the respective welding heads 24.

Further the connections contain power supply lines for supplying the welding head 24 with power from the power supply device of the control and energy unit 20. The connection further contains a compressed air line between the feed unit 22 and the welding head 24, which compressed air line is for feeding elements 12 that are to be welded on. When providing a distributing guide (not illustrated), two or optionally even more welding heads 24 may be connected to one feed unit 22. The welding heads 24 may be permanently mountable welding heads which, for example, are attached permanently to a robot arm, or else may be freely manipulatable welding guns. The feed units 22 and the welding heads 24 can respectively be adapted to fit different kinds of elements 12, both in respect of the material characteristics (for example, steel or aluminum studs) and in respect of the form (Christmas tree studs, earthing studs, threaded studs, etc.).

Figure 2:
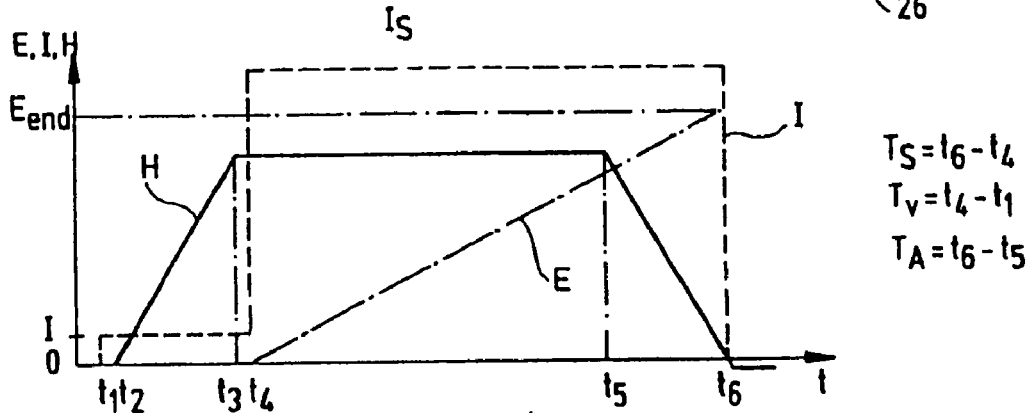
FIG. 2 shows a diagram with a representation of the lifting height of the element, the welding current and the energy input during a welding operation over time in qualitative form.

The welding system 10 as shown represents only one preferred embodiment for use in the industrial field. It is understood that other embodiments could be designed without a special feed unit, the elements 12 to be welded on then being placed in a holder by hand. The operation of the welding system 10 is explained generally hereinafter by reference to FIG. 2. FIG. 2 shows, applied over time t, the lifting height H of the element 12 in relation to the component 14, the welding current I, which current flows from the control and energy unit 20 via the feed unit 22 and the welding head 24 through the stud 12 and the component 14, and the energy quantity E applied to the weld joint. The representation of these variables is of purely qualitative and schematic nature in order to simplify explanation thereof.

When carrying out a weld, initially the element 12 is placed on the component 14 so that an electrical contact is formed. Subsequently at a point in time $t_1$ a so-called pre-current $I_v$ is switched on. Shortly thereafter, at a point in time $t_2$, the element 12 is raised in relation to the component 14, until a point in time $t_3$ at which the welding lift height is reached. During this time the pre-current remains switched on. An arc is drawn as the element 12 is raised. The pre-current arc has sufficient energy to burn off contaminants present in the region of the welding point or to evaporate possible layers of wax. After reaching the welding lift height, at time $t_4$, the welding current $I_s$ is brought into circuit. As a result of the high welding current $I_s$ of approximately, 20 A to 1,500 A for example, the element 12 and the component 14 are melted in the region of the drawn arc. The energy E flowing into the welding operation increases. The lowering operation is initiated at a point in time $t_5$. The element 12 is lowered at a predetermined speed until at a time $t_6$ it impinges on the component 14. At this point in time, the arc is short-circuited and the welding current $I_s$ is switched off. As shown qualitatively in FIG. 2, the lowering operation can take place until slightly below the zero line, in order to guarantee a saturated immersion of the element 12 in the melted surface of the component 14. The melts of element 12 and component 14 unite and cool down owing to the interruption in the energy input. The total energy quantity applied is designated by $E_{end}$ in FIG. 2. The element 12 is thus welded firmly on to the component 14 and may serve as an anchor for fixing parts to the component 14. In FIG. 2 the total welding time $T_s$ is shown, i.e. the time from $t_4$ to $t_6$. The pre-current time $T_v$ is represented as the time from $t_1$ to $t_4$. Finally a lowering time $T_A$ is visible, being the time from $t_5$ to $t_6$. The welding operation described by reference to FIG. 2 corresponds to the prior art. To raise and lower the element 12, either a linear motor or a spring-mass system (with an electromagnet and counter spring) can be used.

In particular when using the electric linear motor 28, the lifting height H can be regulated by setting a certain desired profile for the lifting action and causing the measured lifting height H to be regulated to the respective desired profile. This makes it possible to obtain an accurate positional definition between the element 12 and the component 14 at each point in time of the welding operation. The current I is made available from a constant-current source from the power supply device of the control and energy unit 20. The arc voltage between the element 12 and the component 14 consequently is adjusted according to the electrical resistance present between these two elements. The electrical resistance depends decisively on the surface characteristics, contaminants, etc. and can vary from welding operation to welding operation.

From the WO 96/10468 mentioned at the outset, it is therefore known to regulate the lifting height H during the welding operation such that the arc voltage between the element 12 and the component 14 is constant or follows a predetermined finished profile. By means of this system it is possible to maintain the arc voltage constant during the welding operation and thereby to obtain smaller fluctuations in welding quality from welding operation to welding operation. Details of the regulation process are disclosed in WO 96/10468, the disclosure of which herein is fully implicit by reference thereto. In this document it is also described that the lowering operation takes place at a certain lowering speed which is set beforehand.

In the prior art, this can mean that the total welding time $T_s$ varies from welding operation to welding operation. If, for example, in the representation in FIG. 2 the lifting height H at the time $t_5$ is greater than that shown, the time $t_6$ will shift backwards in time because the lowering speed is constant. Consequently the total welding time $T_s$ will also be lengthened. If by contrast the lifting height is less than that shown in FIG. 2 at the time $t_5$ owing to the regulation of the lifting height for adjusting the arc voltage, the time $t_6$ will shift forwards in time, which leads to a shortening of the total welding time $T_s$. It is understood that the energy input E will also alter correspondingly depending on lifting height H at time $t_5$.

Figure 3:
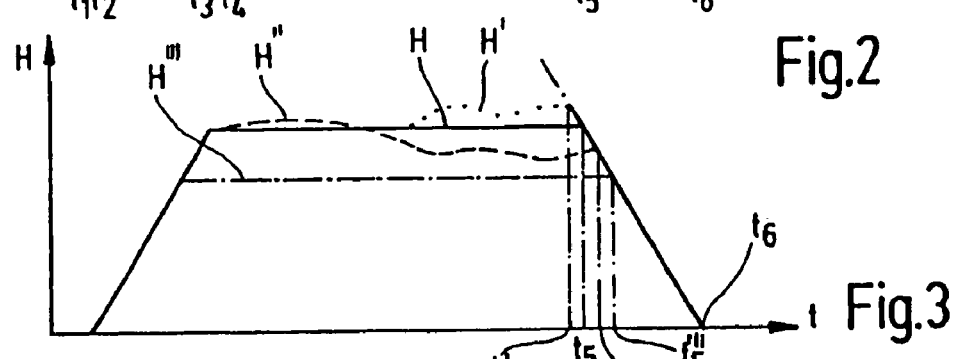
FIG. 3 shows a representation of the lifting height corresponding to FIG. 2 when using the welding process according to the invention.

A preferred embodiment of the arc-welding process according to the invention is shown in FIG. 3. In FIG. 3, on the one hand, the profile of the lifting height H is presented as reference, as is also shown in FIG. 2. In order to obtain a constant total welding time $T_s$, with otherwise unchanged boundary conditions, the welding operation is terminated at $t_6$, irrespective of the lifting height H last adjusted during the welding operation owing to closed-loop control. If the element 12 for arc voltage regulation is raised, for example, in the course of the welding operation, as is shown schematically at H', subject to a constant lowering speed, the initiation of the lowering operation will already take place at a time $t_5'$ which lies prior to the point in time $t_5$. If, in contrast, during the regulation a lower lifting height is set, as is shown schematically at H", the lowering operation will only be initiated at a point in time $t_5''$, which lies chronologically after the point in time $t_5$.

The maintenance of a constant lowering speed starting from the initiation of the lowering operation until the point in time $t_6$ has the following advantages. The lowering speed can, on the one hand, be chosen to be high enough in order to prevent melt dripping from the element 12 on to the component 14 before immersion. On the other hand, the lowering speed can be selected to be sufficiently slow in order to prevent a hard impact on the component 14 which impact could lead to a rebounding and splashing of melt. The value of the set predetermined lowering speed in the case of this embodiment is consequently a compromise between these two boundary conditions.

FIG. 3 further shows that the welding process according to the invention can also be used if the lifting height H is not regulated. However, it may be that in different instances different lifting heights are desired during the welding operation, as shown in FIG. 3 by H, on the one hand, and by H''', on the other hand. Conventionally, a different shutdown time $t_5$ or $t_5'''$ respectively would have to be programmed for the various lifting heights H and H'''. In the process according to the invention, the correct point in time $t_5$ or $t_5'''$ is selected automatically by means of the detected lifting height, thereby rendering a special programming of this point in time unnecessary.

Figure 4:
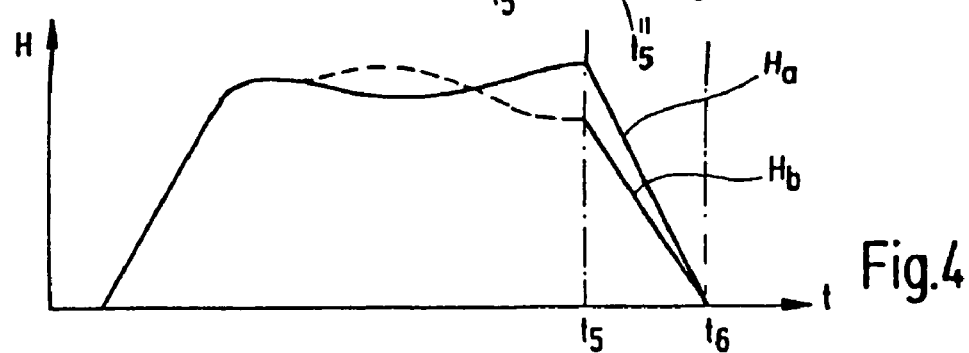
FIG. 4 shows a representation of the lifting height corresponding to FIG. 2 when using an alternative embodiment of the welding process according to the invention.

FIG. 4 shows an alternative embodiment of the welding process according to the invention. In this embodiment the regulation of the lifting height is always up to a fixed point in time $t_5$, irrespective of the lifting height $H_a$ or $H_b$ present at the time $t_5$. In order nevertheless to achieve a set predetermined total welding time, the speed of the lowering operation is selected such that the lowering operation always terminates at a point in time $t_6$. In the example shown in FIG. 4 the lifting height on the curve $H_a$ is thus relatively high at the point in time $t_5$. Consequently a relatively high speed must be set in order to terminate the total welding operation at the point in time $t_6$. If, on the other hand, the lifting height at the point in time $t_5$ is relatively low, as is shown on curve $H_b$, the speed to be selected to reach the total welding duration will be relatively low.

This alternative embodiment of the process according to the invention is slightly simpler to program. In contrast, the embodiment of FIG. 3 has the advantage of a uniform lowering speed and thus a defined immersion operation. A further embodiment of the process according to the invention is presented in FIG. 5. In this embodiment, similarly to the embodiment in FIG. 4, the regulation of lifting height during the welding operation always takes place by the point in time $t_5$.

In order subsequently to achieve a constant total welding time $T_s$, not only is there action to influence the speed of the lowering operation, but also to influence the acceleration thereof. Thus by means of the course of the lifting height action $H_x$ it can be detected, for example, that directly after the point in time $t_5$ the lifting height is reduced initially at a relatively high speed and the speed while approaching the point in time $t_6$ is continuously reduced in order to achieve a gentle immersion operation. It is understood that this manner of influencing the lowering operation can also be used with the embodiment in FIG. 3, in that, instead of a continuous lowering speed, a certain path-time profile of the lowering operation is predetermined, which path-time profile, for example, can take on the form of a parabola, as is shown in FIG. 5.

Figure 5:
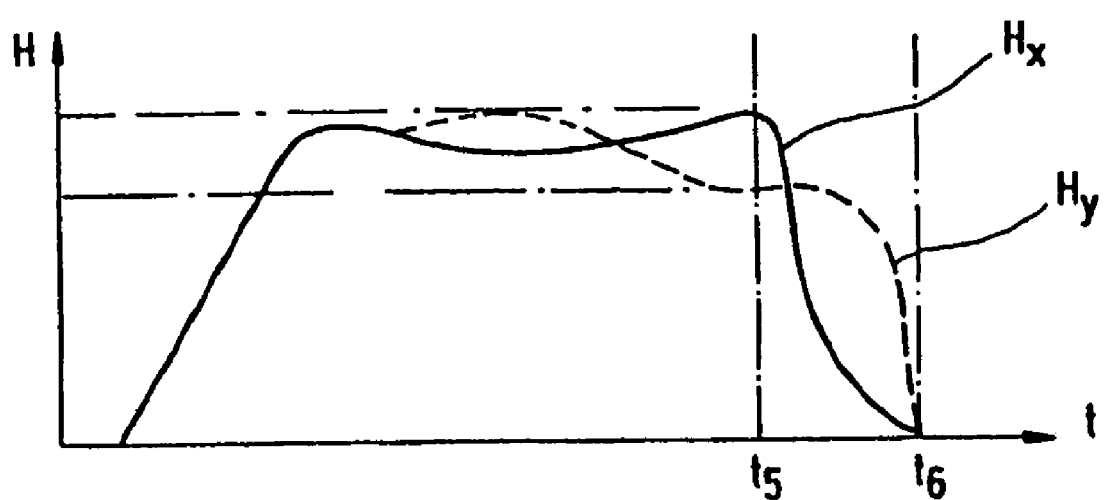
FIG. 5 shows a representation of the lifting height corresponding to FIG. 2 when using a further alternative embodiment of the welding process according to the invention.

In FIG. 5 a further lifting curve $H_y$ is shown wherein the lowering operation is also initiated at a point in time $t_5$ and is terminated at a point in time $t_6$. In this embodiment, to achieve an especially hard impact on the component 14 the lifting height after initiating the lowering operation at the point in time $t_5$ is still maintained comparatively high, and, while approaching the point in time $t_6$, the element 12 is then accelerated towards the component 14.

It is understood that the embodiments in FIGS. 3, 4 and 5 can also be mutually combined in order to complete a welding operation with a certain total welding duration and/or a certain total welding energy. Furthermore it is understood that the process according to the invention can also be applied to short-time arc-welding processes in which the arc is not "drawn".

The invention claimed is:

1. A welding system for welding an element to a component, the system comprising:
   (a) a welding head operably initially moving the element in relation to the component and later returning the element;
   (b) a detector operably detecting movement of the element;
   (c) a controller operably controlling the welding head to return the element at a speed that is a factor of a detected movement; and
   (d) a power supply operably providing power for forming an arc for a specific time between the component and the element, wherein the specified time is controlled by the detected movement and the speed.

2. The welding system of claim 1 further comprising an electric motor operably moving and returning the element.

3. The welding system of claim 2 wherein the electric motor is a linear motor.

4. The welding system of claim 1 wherein the element is a metal stud and the component is a metal sheet.

5. The welding system of claim 4 wherein the metal stud and the metal sheet are parts of a motor vehicle.

6. The welding system of claim 1 wherein the system includes multiple welding heads.

7. The welding system of claim 1 wherein the element is arc welded to the component by the welding head.

8. A welding system for welding an element to a component, the system comprising:
    (a) a welding head operably initially moving the element in relation to the component and later returning the element;
    (b) a detector operably detecting movement of the element;
    (c) a controller operably controlling the welding head to return the element at a speed that is a factor of a detected movement; and
    (d) a power supply operably providing power for forming an arc for a specified welding energy between the component and the element, wherein the specified welding energy is controlled by the detected movement and the speed.

9. The welding system of claim 8 further comprising an electric motor operably moving and returning the element.

10. The welding system of claim 9 wherein the electric motor is a linear motor.

11. The welding system of claim 8 wherein the element is a metal stud and the component is a metal sheet.

12. The welding system of claim 11 wherein the metal stud and the metal sheet are parts of a motor vehicle.

13. The welding system of claim 8 wherein the system includes multiple welding heads.

14. The welding system of claim 8 wherein the element is arc welded to the component by the welding head.

15. A welding system for welding an element to a component, the system comprising:
    (a) a welding head operably advancing and retracting the element in relation to the component and operably providing an arc;
    (b) a detector operably continually detecting a height of the element in relation to the component;
    (c) a power supply operably providing power for forming the arc for a specified time between the component and the element at the height; and
    (d) a controller operably controlling the time for forming the arc as a factor of the height.

16. The welding system of claim 15 further comprising a linear motor operably lowering and lifting the element.

17. The welding system of claim 15 wherein the element and the component are parts of a motor vehicle.

18. The welding system of claim 15 wherein the element is a metal stud and the component is a metal sheet.

19. The welding system of claim 15 wherein the element is arc welded to the component by the welding head.

20. The welding system of claim 15 wherein the controller operably turns off the power for forming the arc after the specified time.

* * * * *